United States Patent
Kuchler et al.

(10) Patent No.: US 8,279,054 B2
(45) Date of Patent: Oct. 2, 2012

(54) METHOD AND MONITORING UNIT FOR MONITORING A TIRE PRESSURE

(75) Inventors: Gregor Kuchler, Regensburg (DE); Axel Müller, Västra Frölunda (DE)

(73) Assignee: Continental Automotive GmbH, Hannover (DE)

( * ) Notice: Subject to any disclaimer, the term of this patent is extended or adjusted under 35 U.S.C. 154(b) by 433 days.

(21) Appl. No.: 12/567,883

(22) Filed: Sep. 28, 2009

(65) Prior Publication Data

US 2010/0188202 A1  Jul. 29, 2010

(30) Foreign Application Priority Data

Sep. 26, 2008  (DE) .......................... 10 2008 049 045

(51) Int. Cl.
*B60C 23/00* (2006.01)

(52) U.S. Cl. ...................................................... 340/442

(58) Field of Classification Search ................. 340/442, 340/447, 988, 995.1, 995.19; 701/29, 209
See application file for complete search history.

(56) References Cited

U.S. PATENT DOCUMENTS

| 4,307,374 | A | | 12/1981 | Bode et al. | |
|---|---|---|---|---|---|
| 5,569,848 | A | * | 10/1996 | Sharp | 73/146.2 |
| 5,847,645 | A | * | 12/1998 | Boesch | 340/442 |
| 6,404,330 | B1 | * | 6/2002 | Sugisawa | 340/444 |
| 7,024,318 | B2 | * | 4/2006 | Fischer et al. | 702/47 |
| 7,221,262 | B2 | | 5/2007 | Kuchler | |

FOREIGN PATENT DOCUMENTS

| DE | 29 22 910 A1 | 12/1980 |
|---|---|---|
| DE | 19650687 A1 | 6/1998 |
| DE | 10144359 A1 | 4/2003 |
| DE | 10 2004 010 010 B3 | 10/2005 |
| DE | 60107331 T2 | 3/2006 |
| DE | 10 2006 047 311 A1 | 6/2007 |

* cited by examiner

*Primary Examiner* — Phung Nguyen
(74) *Attorney, Agent, or Firm* — Laurence A. Greenberg; Werner H. Stemer; Ralph E. Locher

(57) ABSTRACT

A method and a monitoring unit for monitoring an air pressure in a tire of a motor vehicle register a measured value of the air pressure in the tire. The current and/or future distance of the motor vehicle relative to a service station and/or an operating situation of the motor vehicle associated with a service process is then determined. An alarm signal is only then output if the measured value does not reach a predefinable threshold value and one or both of the conditions applies: the current or future distance of the motor vehicle relative to a service station does not reach a predefinable threshold value, the registered operating situation corresponds to a predefinable operating situation.

7 Claims, 1 Drawing Sheet

METHOD AND MONITORING UNIT FOR MONITORING A TIRE PRESSURE

BACKGROUND OF THE INVENTION

Field of the Invention

The invention relates to a method as well as a monitoring device for monitoring an air pressure in a tire of a motor vehicle Wheel or tire pressure checking systems are usually used to monitor the tire pressure in motor vehicles in order to avoid, as far as possible, accidents caused by faulty tires, and/or to promptly identify dangerous situations. The driver receives information relating to the current pressure value in plain text, which he/she either sees constantly in the display or can request at the push of a button.

To minimize the abundance of information which has to be processed by a motor vehicle driver, modern tire pressure checking systems only emit a warning if this reaches a dangerous value (cf. DE 10 2004 010 010 B3 or DE 10 2006 047 311 A1). It is also known for a tire pressure checking system to make a distinction between a dangerous and a non-dangerous failure to reach a threshold value. For instance, dangerously low levels are reported in this case, non-dangerous levels are however only reported when the ignition of the motor vehicle is switched off. This takes place assuming that the driver is now able to increase the tire pressure again and/or check a tire for damage and if necessary repair it or replace it in order to avoid future dangerous situations, cf. DE 29 22 910.

The known method is disadvantageous in that the said assumption is frequently incorrect since the ignition of a motor vehicle is also switched off if the driver is not willing or able to rectify the fault, when stopping at rail-crossing gates for instance. The acceptance of such alarm messages is therefore relatively minimal, particularly because people tend to completely ignore alarm messages which are displayed for a long time but do not have any direct negative consequence. This disregard may result in dangerous situations and serious accidents. In such an extreme case, the same situation exists as if the motor vehicle has no such warning system at all.

BRIEF SUMMARY OF THE INVENTION

The object underlying the present invention now consists in specifying a method and a tire pressure checking system which issue better situation-specific alarm messages and thus exhibit greater acceptance on the part of users.

In accordance with the invention, this object is achieved by a method with the features of claim 1 and/or by a monitoring unit with the features of claim 6.

Accordingly, provision is made in a method for monitoring an air pressure in a tire of a motor vehicle to implement the following steps:
a) register a measured value of the air pressure in the tire;
b) register a current and/or future distance of the motor vehicle relative to a service station and/or register an operating situation of the motor vehicle associated with a service process;
c) output an alarm signal if the measured value does not reach a predefinable threshold value and one or two of the conditions applies to: the current or future distance of the motor vehicle relative to a service station not reaching a predefinable threshold value, the registered operating situation corresponding to a predefinable operating situation.

Accordingly, provision is also made for a monitoring unit for monitoring an air pressure in a tire of a motor vehicle, including;
a) means for registering a measured value of the air pressure in the tire;
b) means for registering a current and/or future distance of the motor vehicle relative to a service station and/or registering an operating situation of the motor vehicle associated with a service process;
c) means for outputting an alarm signal, if the measured value does not reach a predefinable threshold value and one or both of the conditions applies: the current or future distance of the motor vehicle relative to a service station not reaching a predefinable threshold value, the registered operating situation corresponding to a predefinable operating situation.

In accordance with the invention, an alarm signal relating to the tire pressure of a tire is then advantageously only output to the driver if this also appears to be meaningful from the known circumstances, in other words a certain proximity to a service station is given or a stopover in such a service station is determined.

Within the scope of the invention, any place can be understood as a service station which allows for a motor vehicle tire to be serviced, with "service" also being understood here as the filling or release of air. Gas stations which are generally equipped with air pressure units fulfill this criterion in particular. A fault in this equipment can be taken into account by outputting an alarm signal if this factor is known. Service stations can naturally also be garages or tire dealers, which similarly generally have the necessary equipment. When determining a suitable service station, the equipment thereof can naturally also have an influence. In the event of a severe tire blowout, a garage is better suited to repairing the damage than a gas station. When outputting an alarm notification to the driver, this can be taken into account.

It is not only places accessible to the public which are to be understood as service stations. Since many private households have a compressed-air supply, the garage can also be provided as a service station. Whether such a factors exists can be queried for instance during the initial start-up of a motor vehicle.

Within the scope of the invention, an alarm signal is not only understood to be the alarm specific to the driver but also a signal from the monitoring unit to a subordinate unit, which, if necessary, generates on its part an alarm in plain text.

In accordance with the invention, the device or part of the device can finally be understood as the monitoring unit, said device or part thereof evaluating the signals from the sensors needed for the invention, including or excluding these sensors.

Advantageous embodiments and developments of the invention result from the subclaims as well as from the description in conjunction with the figures of the drawing.

It is favorable if the current position of the motor vehicle is determined with the aid of GPS or GSM and if the future position is determined with the aid of a route planned in a navigation system. The said devices are frequently available in modern motor vehicles, as a result of which these can then generate multiple benefits within the scope of the invention.

It is advantageous if one or several of the group: ignition key is removed, door is opened, seat is vacated, radio/infotainment systems remain switched off after the ignition is switched off, fuel tank cap is unlocked/opened, fill level in the tank is low, fill level in the tank is increased, is provided as an operating situation associated with the service process. This information is often readily available in modern motor vehicles and in the case of a correct interpretation, allows for a comparatively precise estimation as to whether an operating system associated with a service process exists. With an increasing fill level in the tank, the assumption can be made that with a probability bordering on certainty the motor vehicle is currently located at a gas station. The locking/opening of the fuel tank cap also allows for such a diagnosis. Even if the fill level in the tank is already low and the ignition key is released or even the seat is empty, a stopover in a gas station is probable and is, if this does not apply, at least always more probable. "Infotainment systems" are such devices which provide the drive both with information and also entertainment. Such systems are known per se and are often embodied as a multifunctional device installed in the center console of the motor vehicle, which includes the functions of radio, TV tuner, CD player, DVD player, navigation device and on-board vehicle computer.

It is also advantageous if step b) is then firstly implemented if the measured value of the air pressure does not reach a predefinable threshold value. In principle, step b) can also be implemented recurrently, it is however more economical only to implement this at the time instant when an alarm notification has in principle been output, in other words if a low tire pressure exists.

It is particularly advantageous if instead of the distances or additionally thereto the temporal gradients or signs thereof are evaluated. If only the distance itself is observed, a service station which would have already been passed could also appear to be the most favorable destination. A driver is not always willing to turn the motor vehicle around, neither does this situation always demand it (with only a minimal drop in pressure). By considering at least the sign of the change in distance, in other words the service station is getting closer/further away, an alarm notification in such a situation can be avoided. It is also possible with the aid of the gradient to determine how long it would take to reach a favorably located service station. This information can also be fed into the inventive process, in order to be better able to weigh up whether waiting to reach the station would be acceptable.

It is also favorable if the means for outputting an alarm signal are arranged in a semiconductor module and the registration means illustrate at least one input and/or one radio receiver module of the same. Semiconductor modules are small, failsafe and easily available. It is therefore favorable to allow the inventive functions to run in such a semiconductor module, for instance microprocessor with a memory. An integration of the inventive method, or the means required therefor, is however also possible in an already available on-board computer system.

The above embodiments and developments of the invention can be combined in any manner.

The present invention is described in more detail below with reference to the exemplary embodiments specified in the schematic figures of the drawing, in which;

DESCRIPTION OF THE INVENTION

Figure 1:
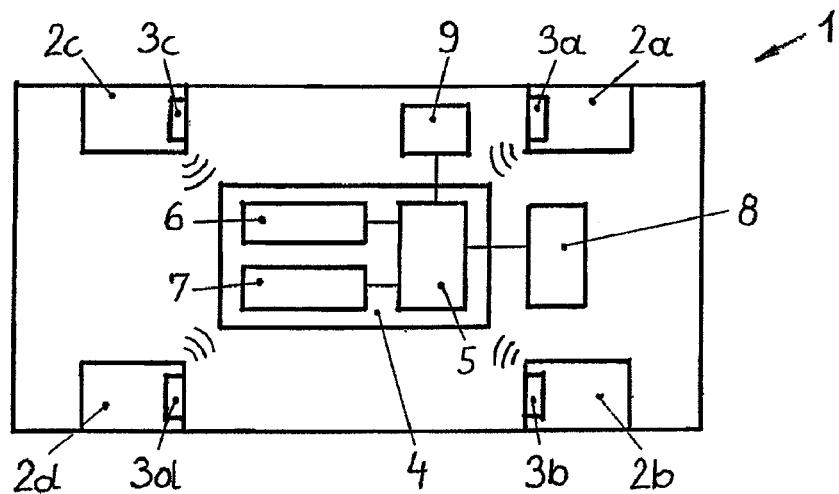
FIG. 1 shows a top view of the motor vehicle with a monitoring device

Identical and functionally identical elements and features, unless embodied otherwise, are provided with the same reference characters in the figures of the drawing.

FIG. 1 shows a motor vehicle 1, comprising 4 tires 2a ... 2d with tire pressure sensors 3a ... 3d assigned thereto in each instance, a monitoring device 4 as well as an output device 8 connected to the monitoring device 4 and a position sensor 9 connected to the monitoring device 4.

The monitoring device 4 includes a microcontroller 5 and a memory 6 connected thereto, as well as a receiver 7 for registering the signals of the sensors 3a ... 3d transmitted by way of radio. The memory 6 can inter alia also be provided to store the data and processes needed for the inventive method. The method is generally stored in the memory 6 in the form of a program. The microcontroller 5 reads this out and processes the method step by step. The monitoring device 4 can also be part of an on-board computer system (not shown), which also implements other control tasks of the motor vehicle 1. Parts of the monitoring device 4 are then not to be seen as physical but instead as functional blocks. To simplify matters, it is assumed below that the monitoring device 4 is a separate device.

Figure 2:
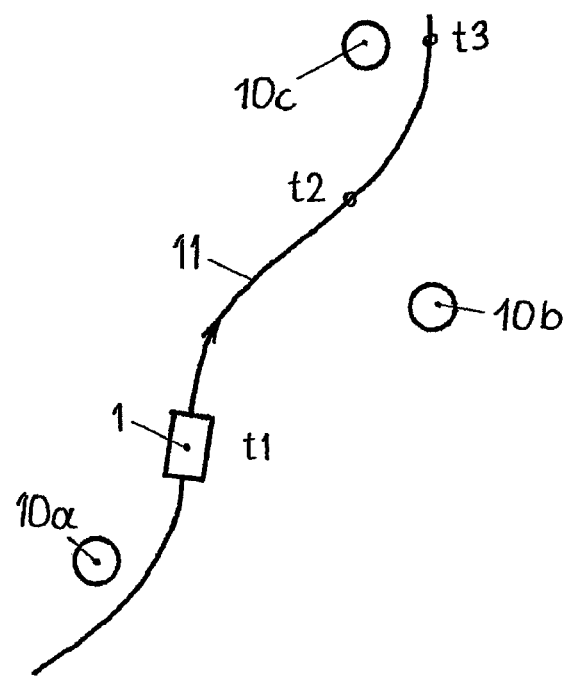
FIG. 2 shows a motor vehicle along a driving route

FIG. 2 shows the motor vehicle 1 which moves along a route 11, along which the service stations 10a ... 10c are positioned at greater or lesser distances.

The assumption is made in a first example that the motor vehicle 1 has a navigation system, in which the route 11 was stored. At a time instant t1, a drop in pressure in a tire 2a ... 2d of the motor vehicle 1 is detected, which does not represent any immediate danger and is thus not displayed straight away. It is assumed here that the first step a) of the method according to the invention is implemented regularly.

In principle, the second step b) can likewise be regularly implemented, but it is assumed for this example that the second step b) is then only implemented if the measured value of the air pressure does not reach a predefinable threshold value. This condition applies to the time instant t1. The current distance of the motor vehicle 1 relative to the service stations 10 ... 10c is consequently determined along the route 11. This shows that the motor vehicle 1 is closest to the service station 10a.

In one embodiment of the invention, a notification is given that the air pressure in one of the tires 2a ... 2d should be increased and this could take place at the service station 10a.

The current most favorable service station nevertheless does not have to offer the most advantageous solution overall. In an advantageous embodiment of the invention, the future distances of the motor vehicle 1 relative to the service stations 10a ... 10c are thus also determined along the route 11. This shows that at time instant t2 the service station 10b is most favorable and at time instant t3 the service station 10c is most favorable. Since the distance between motor vehicle 1 and service station 10c at time instant t3 is nevertheless less than the distance between motor vehicle 1 and service station 10b at time instant t2 and also less than the current distance (at time instant t1) of the motor vehicle 1 relative to the service station 10a, waiting until time instant t3 is overall more favorable. The alarm notification is thus only issued shortly before the service station 10c is reached.

It is easily apparent from FIG. 2 that the service station 10a has the shortest distance from route 11 overall, in other words along the overall route 11. If the drop in pressure is detected before time instant t1, the service station 10a can therefore be located most favorably of all three service stations 10 ... 10c. Approaching this service station 10a is then only sensible if this had not already been passed as at time instant t1, and could only be reached by turning the motor vehicle 1 around. For this reason the temporal gradients of the distances relative to the service stations 10a ... 10c are also evaluated in a further advantageous embodiment of the invention. This shows that the distance of the motor vehicle 1 relative to the service stations 10 has a positive temporal gradient, the distance therefore increases. Reference to the service station 10a is thus less advantageous. Approaching the service station 10c would thus be recommended in such a situation.

Differentiated recommendations are naturally also conceivable. The severity of the tire blowout can also influence the decision-making for instance. Whereas in the case of a slight drop in pressure the continued travel to the service station 10c appears to be sensible, with a severe drop in tire pressure, making for the service station 10b or even returning to the service station 10a can be advisable and a corresponding alarm notification can therefore be output.

In a second example, the motor vehicle 1 does not have a navigation system. Data relating to the current or future location of the motor vehicle 1 is therefore not present in the on-board computer system. A drop in pressure in a tire 2a ... 2d of the motor vehicle 1 is detected again at a time instant t1, said drop in pressure not representing any immediate danger and therefore not being displayed immediately.

As, however, the driver intends to refuel the motor vehicle 1 (randomly), he/she approaches the service station 10b. He removes the ignition key, opens the door, leaves the seat and then opens the fuel tank cap. With a probability bordering on certainty, the motor vehicle 1 is now at a gas station. Because the tire pressure in a tire 2a ... 2d has fallen and the motor vehicle 1 is in a predetermined operating state which permits logical closure, the motor vehicle 1 is at a gas station, the alarm notification is output on the dashboard of the motor vehicle 1. This alarm notification will supposedly remain unnoticed during the refueling process, but it should be assumed that he registers this on entry into the motor vehicle 1 and subsequently adopts the necessary measures.

Since when leaving a gas station a driver is very preoccupied with the surrounding traffic situation, such an alarm notification can however also remain unnoticed until leaving the gas station. For this reason in an advantageous embodiment of the invention, an alarm notification is output directly adjacent to the fuel tank cap or on the B-pillar in order to make the drive aware of the excessively low air pressure in the tires 2a ... 2d even before driving.

A series of predefinable operating situations is naturally possible in order to detect the stopover of the motor vehicle 1 at a service station 10a ... 10d. It is possible for instance to only detect an increase in the fill level in the tank, since gasoline or diesel is in any case then refueled. It is also possible to use the combination "ignition key removed" and "low fill level in the tank" as the criterion, since it is also obvious here that the driver has stopped at a gas station or will at least look for one in the immediate future. Finally, it is also possible only to output an alarm notification when the fill level in the tank has been increased and the driver's seat was occupied again, in other words the driver has reentered the vehicle 1 after refueling.

In a third example, the features of the first and second example are combined, in other words, the motor vehicle 1 has both a navigation system as well as a logic for evaluating different sensors on the motor vehicle 1, in order to be able to determine a certain operating situation of the motor vehicle 1, which logic can be implemented both in hardware as well as in software.

In this example, the route 11 shown in FIG. 2 was again programmed into the navigation system. It is assumed that this is a journey of several hours. For this reason, the driver—although no drop in pressure was actually detected—will, shortly before reaching the service station 10a, stop here and increase the tire pressure, for instance by 0.1 or 0.2 bar, so that the fuel consumption and the $CO_2$ emissions can be reduced on the further route.

The tank level can naturally also be included in the alarm notification, for instance if the tank level is not sufficient for the planned journey. In this case, the driver can be notified that he has to stop somewhere along the route. If he does this at the service station 10a, he is moreover able to save on gasoline. The acceptance of the alarm notification is thus significantly increased.

Some variants of the invention which can be applied to all examples are described below.

An alarm message can be output on different points of the motor vehicle 1. Aside from the obvious outputting on the dashboard, for instance on a display 8 or a head-up display, the output via a display or a warning light (e.g. LED) directly adjacent to the fuel tank cap is also possible. For optical reasons, this can also be attached below the tank cover covering the actual fuel tank cap, since an alarm notification at this point is then useful if this cover is opened for a fuelling process and thus implies the stopover at a service station 10a ... 10c. The motor vehicle 1 can naturally also output the alarm notification acoustically, advantageously as spoken text. The output of the alarm notification to a mobile telephone of the driver is also conceivable. Voice messages, SMS messages as well as so-called push-services are also possible here for instance. The output on a display, a warning light or a vibration alarm is also possible, which are arranged on the key of the motor vehicle 1.

Aside from the warning, the alarm notification can also contain identical data relating to the target pressure. Particularly if this is output on an "external" display, in other words on the key or mobile telephone for instance, the target pressure can be immediately read off when inflating the tires 2a ... 2d, which reduces the risk of the tires 2a ... 2d being inflated to the wrong pressure. In a further advantageous embodiment, attainment of the target pressure of the motor vehicle 1, in other words by way of the tire pressure sensors 3a ... 3d which are anyway present, is monitored and communicated to the driver. The motor vehicle 1 or the key can also output a beep.

It is also advantageous for the motor vehicle 1 to notify which tires 2a ... 2d are then actually to be inflated. A corresponding notification, for instance "inflate front left tire" can take place for instance by way of one of the previously cited output means.

An elegant possibility of registering a faulty tire pressure consists in allowing the flashing light assigned to a wheel to flash during a gas station stopover. If a rear left tire blowout is diagnosed, then only the left, rear flashing lights can also be activated during a gas station stopover. Since the activation of an individual flashing light does not occur in any other operating state of the motor vehicle 1, this is intuitively understood by the driver as an alarm notification (flashing signal light) on the left rear motor vehicle side.

A series of possibilities are also available for the location of the motor vehicle 1 (not immediately applicable to example 2). Aside from evaluating GPS data (Global Positioning System), an evaluation of GSM data (Global System for Mobile Communications) and the location of the motor vehicle is also possible by means of triangulation. The speed and the direction of the motor vehicle 1 can naturally also influence the determination of the coordinates. The latter is possible by way of the steering angle and/or compass. Position data can possibly also be obtained by another motor vehicle, which has a navigation system. The this end, RF field proximity connections are provided, for instance Bluetooth or WLAN.

The invention claimed is:

1. A method of monitoring a tire pressure in a tire of a motor vehicle, which comprises the following method steps:
   a) acquiring a measured value of the tire pressure in the tire from sensors;
   b) if a monitoring device determines that the measured value of the tire pressure undershoots a predefined threshold value, performing the following steps with the monitoring device:
      identifying a plurality of service stations located near different points on a driving route planned in a navigation system of the motor vehicle, and
      issuing an alarm notification and recommending travel to one of the plurality of service stations.

2. The method according to claim 1, which comprises determining a current position of the motor vehicle with the aid of GPS or GSM and determining a future position of the motor vehicle with the aid of the route planned in the navigation system.

3. The method according to claim 1, which comprises evaluating temporal gradients relative to the plurality of service stations or signs thereof.

4. A monitoring unit for monitoring a tire pressure in a tire of a motor vehicle, comprising:
   a monitoring device for receiving a measured value of the tire pressure in the tire;
   said monitoring device programmed to determine whether or not the measured value of the tire pressure undershoots a predefined threshold value and if the measured value of the tire pressure undershoots the predefined threshold value to:
      identify a plurality of service stations located near different points on a driving route planned in a navigation system of the motor vehicle, and
      issue an alarm notification and recommend travel to one of the plurality of service stations;
   an output device for outputting the alarm notification.

5. The monitoring unit according to claim 4, which further comprises sensors for determining a current position of the motor vehicle with the aid of GPS or GSM, and wherein said monitoring device includes a processor for calculating a future position of the motor vehicle with the aid of the route planned in the navigation system.

6. The monitoring unit according to claim 4, wherein said output device is configured to evaluate temporal gradients relative to the plurality of service stations or signs thereof.

7. The monitoring unit according to claim 4, wherein said output device for outputting the alarm notification is disposed in a semiconductor module.

* * * * *